(12) United States Patent
Kielb et al.

(10) Patent No.: US 7,082,842 B2
(45) Date of Patent: Aug. 1, 2006

(54) SOFTWARE CORRECTION METHOD AND APPARATUS FOR A VARIABLE ORIFICE FLOW METER

(75) Inventors: John Allan Kielb, Eden Prairie, MN (US); Grant Bradley Edwards, Minneapolis, MN (US)

(73) Assignee: Rivatek Incorporated, St. Louis Park, MN (US)

( * ) Notice: Subject to any disclaimer, the term of this patent is extended or adjusted under 35 U.S.C. 154(b) by 0 days.

(21) Appl. No.: 10/877,377

(22) Filed: Jun. 25, 2004

(65) Prior Publication Data

US 2005/0284235 A1    Dec. 29, 2005

(51) Int. Cl.
*G01F 1/22* (2006.01)

(52) U.S. Cl. .................................................. 73/861.53

(58) Field of Classification Search ............. 73/861.42, 73/861.52, 861.53, 861.63
See application file for complete search history.

(56) References Cited

U.S. PATENT DOCUMENTS

| | | | |
|---|---|---|---|
| 1,098,247 A | 5/1914 | Gibbs | |
| 1,580,678 A | 4/1926 | Roučka | |
| 1,946,319 A | 2/1934 | Hodgson et al. | |
| 4,149,254 A | 4/1979 | Molusis | |
| 4,406,161 A | 9/1983 | Locke et al. | |
| 5,251,148 A | 10/1993 | Haines et al. | |
| 5,576,498 A | 11/1996 | Shambayati | |
| 6,539,315 B1 * | 3/2003 | Adams et al. ................. | 702/47 |

FOREIGN PATENT DOCUMENTS

| | | |
|---|---|---|
| DE | 37 13 542 A1 | 10/1987 |
| EP | 0 565 485 A1 | 10/1993 |
| EP | 0 767 895 B1 | 1/1999 |
| JP | 8-136306 | 5/1996 |
| JP | 11117915 | 4/1999 |

OTHER PUBLICATIONS

Measurement and Modeling of the Flow Characteristics of Micro Disc Valves; J. A. Carretero, Massachusettes Institute of Technology; K.S. Breuer, Brown University; 8 pages; presented at a conference in Nov. 2000.

* cited by examiner

*Primary Examiner*—Harshad Patel
(74) *Attorney, Agent, or Firm*—Merchant & Gould P.C.

(57) ABSTRACT

A method of improving the accuracy of a variable orifice flow meter that includes characterizing the discharge coefficient of the flow meter orifice for different orifice openings and for different differential pressures. The method may be particularly useful with a flow metering and controlling device that includes a fluid flow conduit having at least one planar inner wall and an element having a linear edge configured to mate with the at least one planar inner wall of the fluid flow conduit. The element is movable relative to the conduit to define a flow orifice and vary a cross-sectional area of the orifice. The device also includes a processor configured to calculate the fluid flow based on the cross-sectional area of the orifice, the differential pressure, and the discharge coefficient.

14 Claims, 12 Drawing Sheets

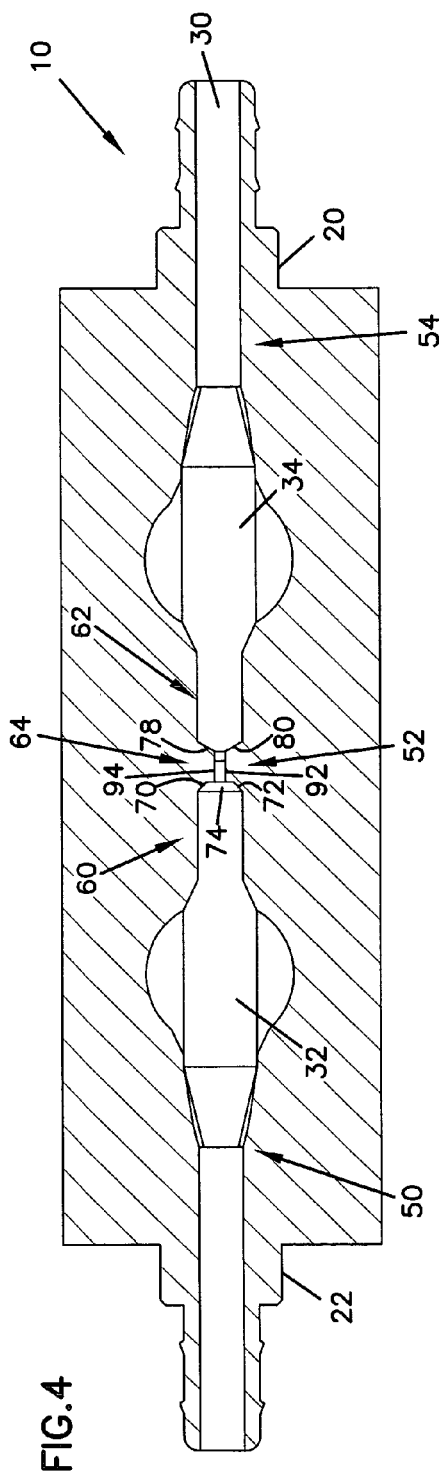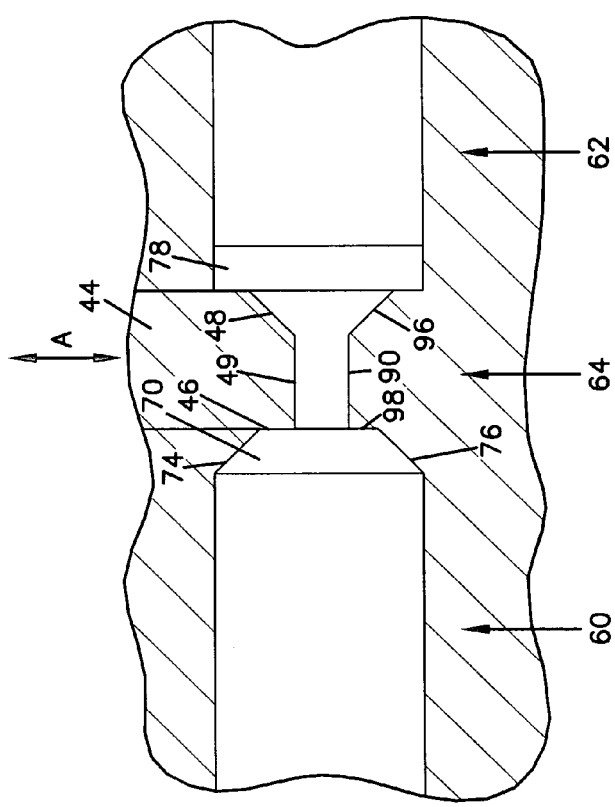
FIG.4
FIG.5

| Orifice Opening | Differential Pressure | | | | | | | |
|---|---|---|---|---|---|---|---|---|
| | 0 psi | 1 psi | 2 psi | 3 psi | 4 psi | 5 psi | 6 psi | 7 psi |
| 0.01 in² | 0.65 | 0.66 | 0.67 | 0.68 | 0.69 | 0.70 | 0.71 | 0.72 |
| 0.02 in² | 0.66 | 0.67 | 0.68 | 0.69 | 0.70 | 0.71 | 0.72 | 0.73 |
| 0.03 in² | 0.67 | 0.68 | 0.69 | 0.70 | 0.71 | 0.72 | 0.73 | 0.74 |
| 0.04 in² | 0.68 | 0.69 | 0.70 | 0.71 | 0.72 | 0.73 | 0.74 | 0.75 |
| 0.05 in² | 0.69 | 0.70 | 0.71 | 0.72 | 0.73 | 0.74 | 0.75 | 0.76 |
| 0.06 in² | 0.70 | 0.71 | 0.72 | 0.73 | 0.74 | 0.75 | 0.76 | 0.77 |
| 0.07 in² | 0.71 | 0.72 | 0.73 | 0.74 | 0.75 | 0.76 | 0.77 | 0.78 |
| 0.08 in² | 0.72 | 0.73 | 0.74 | 0.75 | 0.76 | 0.77 | 0.78 | 0.79 |

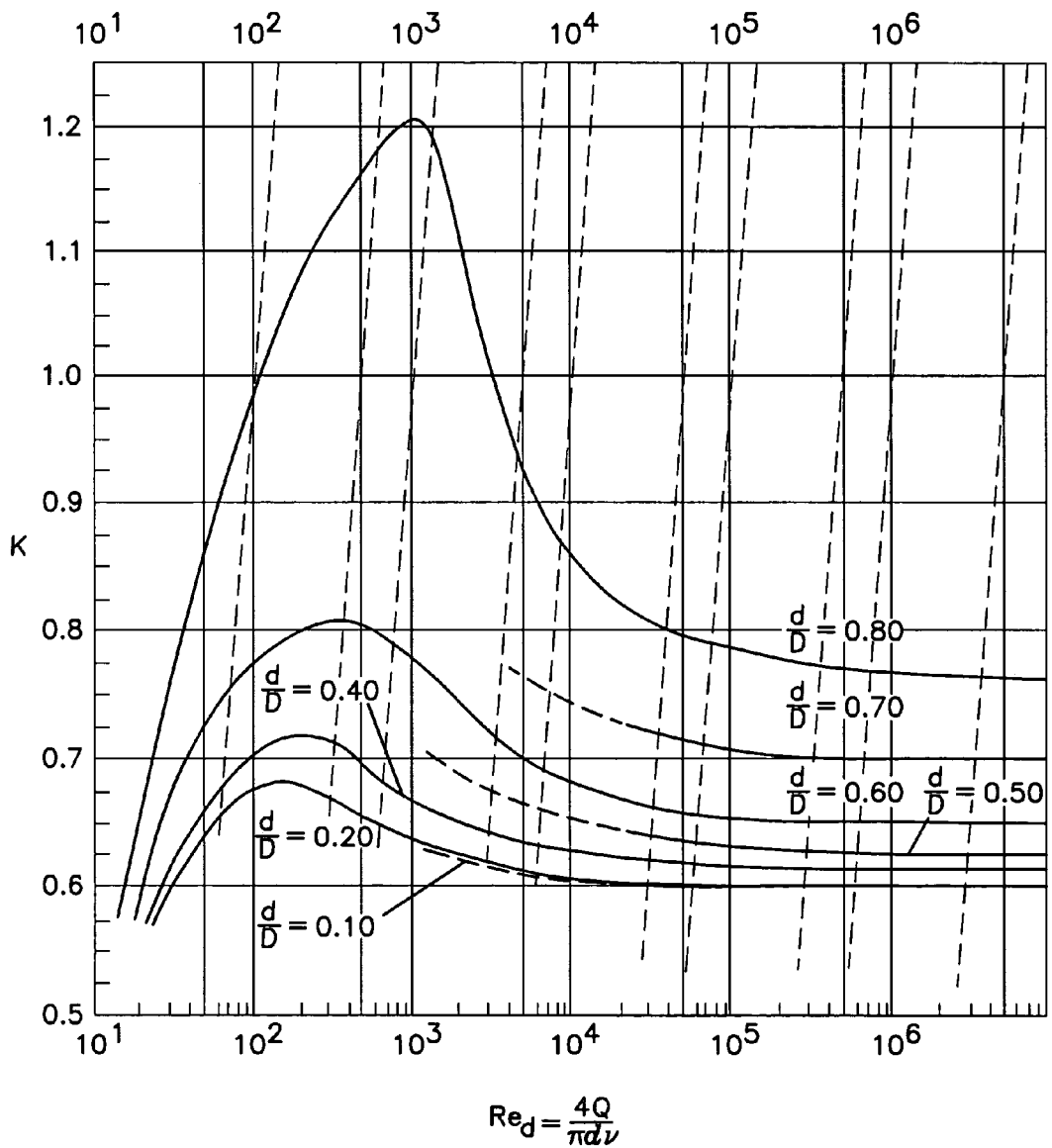

SOFTWARE CORRECTION METHOD AND APPARATUS FOR A VARIABLE ORIFICE FLOW METER

BACKGROUND OF THE INVENTION

1. Technical Field

The present invention generally relates to fluid flow metering and control devices, and more particularly relates to software related correction methods for such flow devices.

2. Related Art

In process control industries, it is common to use small diameter tubes to carry process fluids at low flow rates when small amounts of fluids are required for manufacturing processes. The tubes are almost always of a circular cross-section. Instruments used to measure a flow rate in the tubes must interface with a fluid flowing in the tube while minimizing disturbance to the fluid flow. To minimize disturbance to the fluid flow, the instrument typically includes a circular cross-section to match the cross-section of the tubes. The flow rate for a flow meter measuring a change in pressure across an orifice is defined by the following Equation 1:

$$Q = C \cdot A_o \cdot \left( \frac{1}{1 - \left(\frac{A_o}{A_p}\right)^2} \right)^{\frac{1}{2}} \cdot \left( 2 \cdot \frac{(P_{hi} - P_{lo})}{\rho} \right)^{\frac{1}{2}} \qquad \text{Equation 1}$$

Where:
Q=volumetric flow rate
C=orifice discharge coefficient
$A_o$=cross-sectional area of the orifice
$A_p$=cross-sectional area of the pipe
$P_{hi}$=upstream pressure
$P_{lo}$=downstream pressure
ρ=density of the fluid The differential pressure measurement ($P_{hi}$–$P_{lo}$) could be made using two individual pressure measurements and combining them to get the pressure difference or pressure drop or using a single device as represented in FIG. 15.

When orifices and differential pressure measurements are used to calculate flow through large pipes it is common for them to be discrete devices that are bolted or otherwise attached to the pipe. There are also devices available for measuring the flow in small tubes that have the orifice and pressure sensors integrated into the same housing. In almost all cases, the measuring device orifices are of a fixed size for measuring flow over a fixed flow range. The flow characteristic or "discharge coefficient" of the orifice is measured, or determined by design, by the manufacturer. For discrete systems, the end user may calculate the flow based upon the parameters in Equation 1, including a manufacturer provided discharge coefficient. In integrated systems, the discharge coefficient can simply be accounted for as part of a total device calibration performed by the manufacturer.

Differential pressure orifice flow metering is most accurate when the flow rate is near the upper end of the flow range that the meter is designed for; that is, where the pressure change is relatively large for a given change in flow rate. As the flow rate decreases, the accuracy of the device decreases because there is a relatively small pressure change for a given change in flow rate. This phenomena can also be described as a decrease in the differential pressure to flow rate ratio, which ratio is shown in the graph of FIG. 16. Since the pressure differential must be accurately known to calculate the flow rate, any error in the differential pressure measurement causes an error in the flow calculation. As the slope of the curve gets steeper at low flow rates (see FIG. 16), any pressure measurement error causes a larger flow calculation error.

In order to make more accurate flow measurements over a larger range of flow rates using an orifice and differential pressure measurement, it may be advantageous to use a variable-sized orifice. A variable-sized orifice can be used to improve the flow measurement accuracy over the range of orifice openings by providing a relatively high pressure differential for each flow rate. However, even though computational fluid dynamics (CFD) software can be used to optimize the design of a variable-sized orifice, there is still a small change in the discharge coefficient as the size of the orifice is varied. This change is due to the range of flows that the device is designed to measure, and the physical factors that contribute to the discharge coefficient of an orifice.

Some variable-sized orifice devices are designed to cover flow ranges that begin in the laminar flow region and end in the turbulent flow region, which make it likely that the discharge coefficient will vary in the different flow ranges. Also, it is known that the discharge coefficient of an orifice is comprised of a combination of physical effects relating to the fluid and the shape of the orifice. When the orifice is set for a very small opening, the surface area of the walls of the flow path are large relative to the cross-sectional area of the flow path. This is because a "slit" type opening results. In a slit type opening, the viscous force of the liquid against the walls in the orifice region of the flow path becomes much more significant than when a larger opening is present. A larger ratio of the wall surface area to the flow path cross-sectional area has the effect of lowering the discharge coefficient of the orifice.

Although a variable orifice flow meter may have the advantage of extending the range of a flow meter by as much as a factor of 10, it may have the inherent drawback of decreased accuracy due to slight changes in the discharge coefficient at different openings, and for different flow rates at any given opening size.

In addition to the above noted disadvantages related to discharge coefficients, known variable orifice devices are ineffective for several other reasons. First, known variable orifice devices typically use circular or curved members that are moved with respect to the fluid flow to change the size of the orifice. Because of the curved nature of these members, the shape of the orifice changes as the size of the orifice changes, which results in significant errors when calculating the fluid flow over a range of orifice sizes. Second, the changed shape of the orifice leads to non-ideal orifice shapes for at least a portion of the flow range. This leads to inconsistent flow characteristics for any given opening as flow rate changes, again leading to errors in the calculation of fluid flow.

A flow device that addresses these and other shortcomings of known flow control and metering devices would be an important advance in the art.

SUMMARY OF THE INVENTION

The present invention generally relates to software related correction methods for flow devices such as differential pressure flow metering and controlling devices. One aspect of the invention relates to a method of metering fluid flow through a variable orifice. The method includes determining a cross-sectional area of the orifice, measuring a pressure differential across the orifice, and selecting a discharge coefficient from an array of discharge coefficient values. The discharge coefficient is dependent on the determined cross-sectional area and the measured pressure differential. The method may also include solving a flow equation using the discharge coefficient to determine the fluid flow.

Another aspect of the invention relates to a method of metering fluid flow through a variable orifice. This method includes determining a cross-sectional area of the orifice, measuring a pressure differential across the orifice, calculating a discharge coefficient using the determined cross-sectional area and the measured pressure differential, and solving a flow equation using the calculated discharge coefficient to determine the fluid flow. These method steps may be repeated at predetermined time intervals for at least the purposes of updating the metered values or validating previous measurements.

A further aspect of the invention relates to a device for metering fluid flow, wherein the device is of the type having a variable orifice. The device includes a variable sized orifice defined by a fluid flow conduit and an element movable relative to the fluid flow conduit to vary a size of the orifice, a pressure sensor configured to determine a pressure differential across the orifice and generate a pressure signal, a positioning device configured to determine a position of the element relative to the conduit and generate a position signal, and a processor configured to determine the fluid flow rate using the pressure signal, the position signal, and a discharge coefficient that is dependent on the pressure signal and the position signal.

Another device according to principles of the present invention is a device for measuring and controlling fluid flow. The device includes a conduit having a variable orifice defined by a movable element adapted and configured to engage a surface of the conduit and to control fluid flow in the conduit, a pressure sensor configured to measure pressure in the conduit, a position device configured to determine a position of the movable element relative to the conduit surface, and a processor configured to calculate a discharge coefficient based on the position of the movable element and the measured pressure and to calculate a fluid flow through the conduit. The processor may also be configured to compare the calculated fluid flow to a desired fluid flow and adjust the position of the variable orifice to increase or decrease fluid flow as required.

These and further objects of the present invention will become clearer in light of the following detailed description of illustrative embodiments of this invention. described in connection with the drawings.

BRIEF DESCRIPTION OF THE DRAWINGS

The illustrative embodiments may best be described by reference to the accompanying drawings where:

FIG. 4 is a cross-sectional view of the example flow device shown in FIG. 3 taken along cross-section indicators 4—4;

FIG. 5 is an enlarged view of the orifice and movable element portion of the device shown in FIG. 3;

FIG. 19 is a graph representing known values of flow coefficient verses Reynolds number for an orifice.

DETAILED DESCRIPTION OF THE PREFERRED EMBODIMENT

Figure 1:
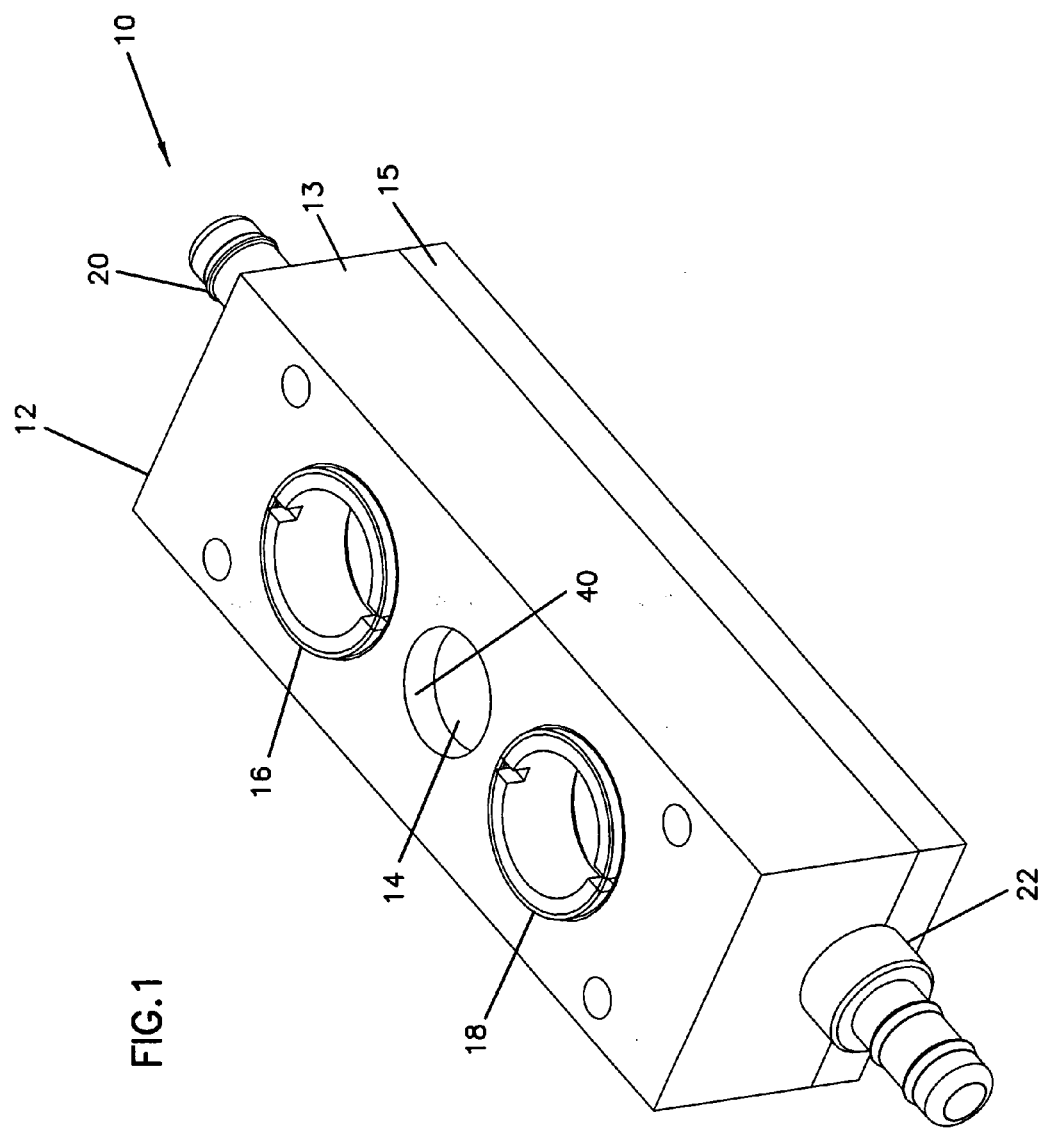
FIG. 1 is a top perspective view of a flow device according to principles of the invention.
Figure 2:
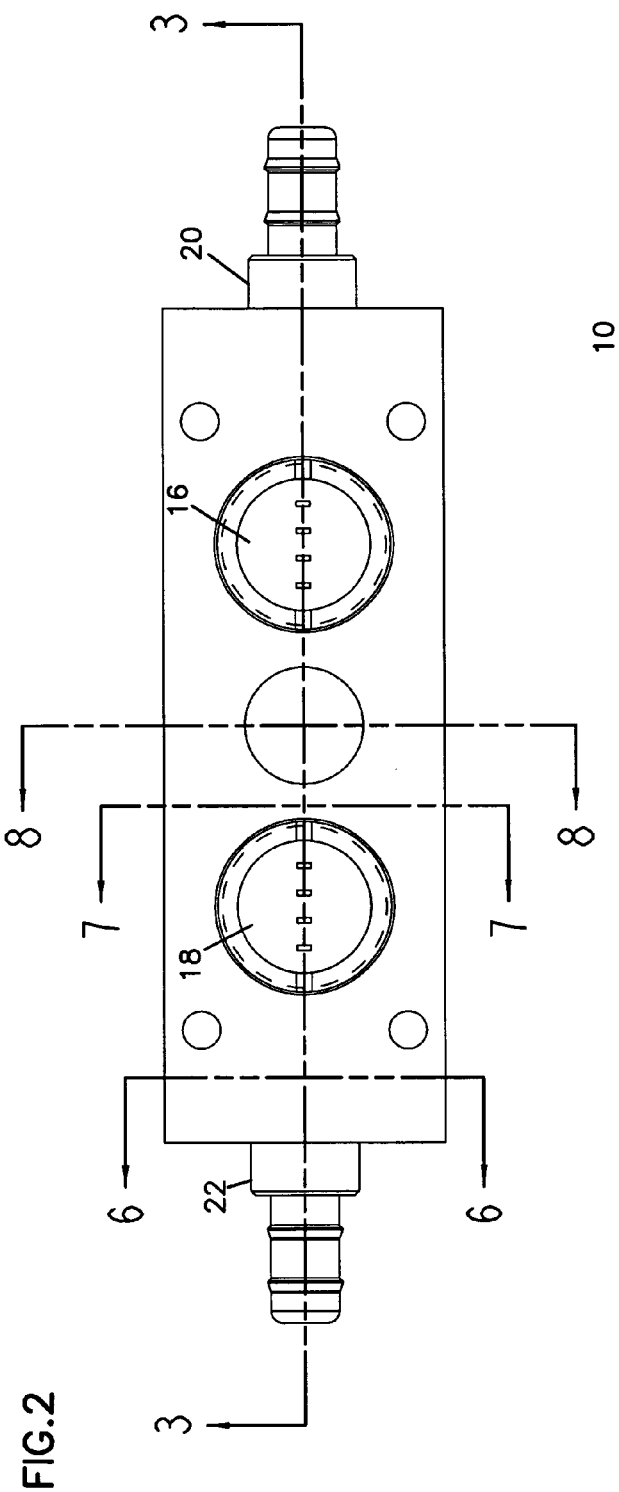
FIG. 2 is a top plan view of the flow device shown in FIG. 1.
Figure 3:
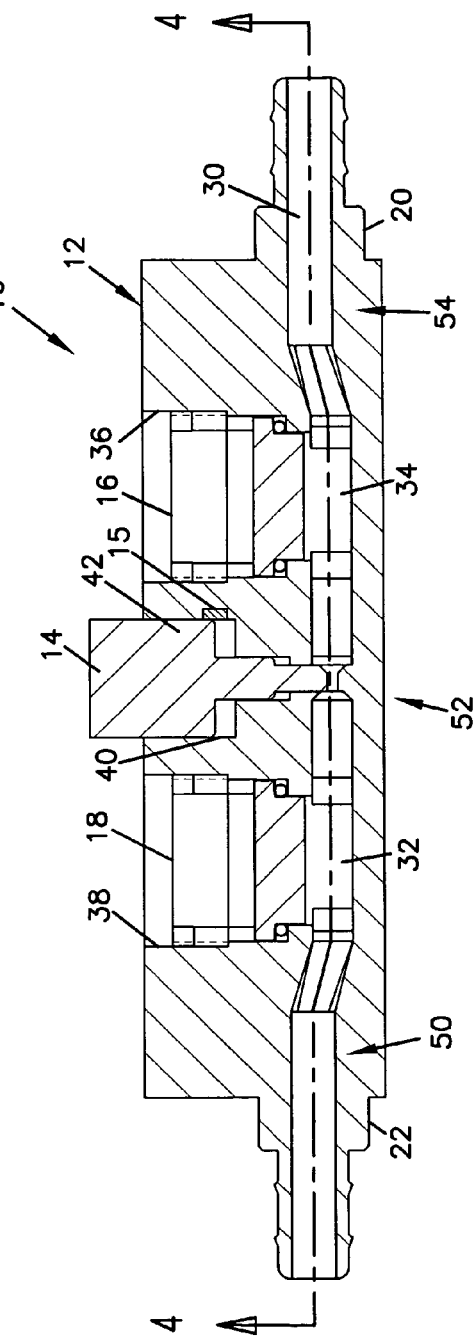
FIG. 3 is a cross-sectional view of one example configuration of the flow device shown in FIG. 2 taken along cross-section indicators 3—3.
Figure 8:
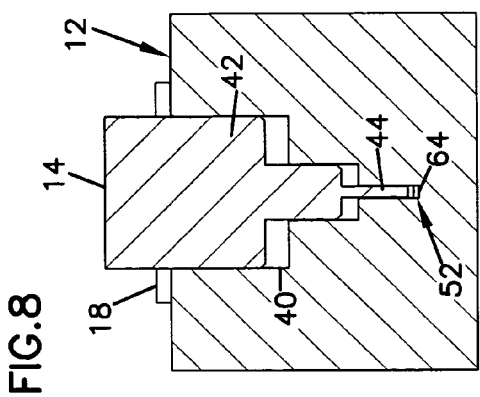
FIG. 8 is a cross-sectional view of the example flow device shown in FIG. 2 taken along cross-section indicators 8—8.
Figure 7:
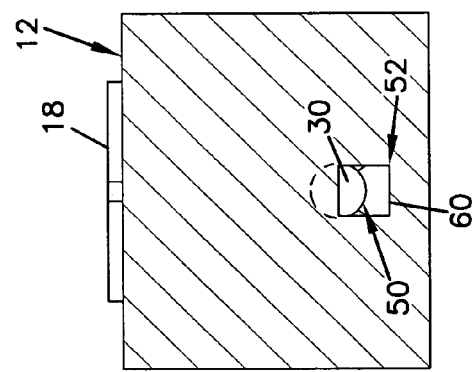
FIG. 7 is a cross-sectional view of the example flow device shown in FIG. 2 taken along cross-section indicators 7—7, the example device having a rectangular inlet to the orifice.
Figure 9:
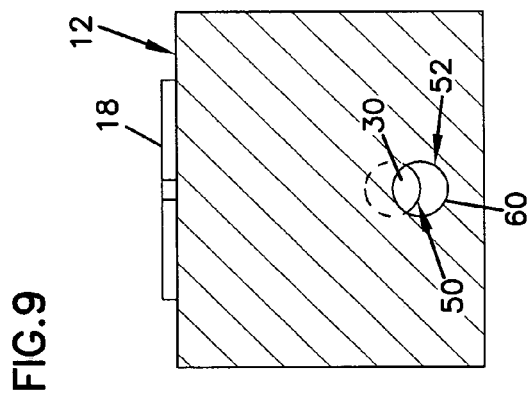
FIG. 9 is a cross-sectional view of an alternative embodiment of the example flow device shown in FIG. 2 taken along cross-section indicators 9—9, the example device having a circular inlet to the orifice.
Figure 6:
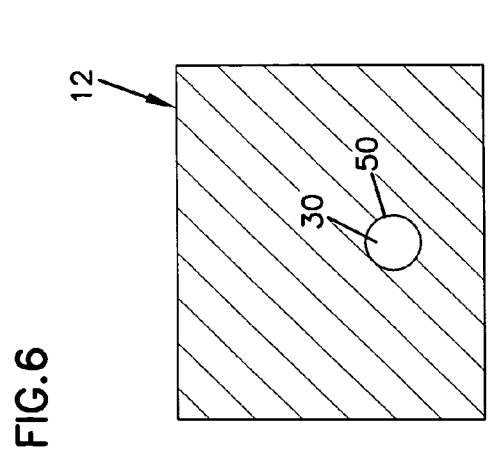
FIG. 6 is a cross-sectional view of the example flow device shown in FIG. 2 taken along cross-section indicators 6—6.

The invention generally relates to fluid flow metering and control devices, and more particularly relates to variable-sized orifice flow devices and software related correction methods for such flow devices. The variable-sized orifice may be particularly suited for use in a differential pressure flow meter as will be described herein with reference to the several drawings, although such an application is only exemplary of the many applications to which principles of the present invention may be applied.

The software related correction methods may utilize a matrix or array of stored discharge coefficients that correlate to specific pressure differential and orifice size characteristics of the flow device. Other software related correction methods may utilize equations or algorithms to calculate an exact discharge coefficient for each determined pressure differential and orifice size of the flow device. The arrays of discharge coefficients and the equations/algorithms used to calculate discharge coefficients may be stored in memory and used by a controller, such as a processor, to determined fluid flow.

I. Example Flow Device

An example flow device 10 constructed in accordance with the principles of the present invention for controlling and metering fluid flow is shown in FIGS. 1–9. The device includes a housing 12, a moveable element 14, first and second pressure sensors 16, 18, and inlet and outlet conduit connectors 22, 20. A conduit 30 is formed through the housing and includes first, second and third segments 50, 52, 54. The housing also includes first and second sensor bores 36, 38 that intersect with the conduit 30 in a direction transverse to the conduit 30, and an element bore 40 that also intersects with conduit 30 in a direction transverse to conduit 30. In this example, element bore 40 and sensor bores 36, 38 extend parallel to each other, but may be aligned perpendicular to each other in other embodiments. Housing 12 may be divided into separate pieces or halves 13, 15 (see FIG. 1) to facilitate precise formation of intricate features within the housing, or may be integrally formed as a single piece.

Moveable element 14 includes a base 42 and a contact member 44, and is positioned in element bore 40 so as to extend into second segment 52 of the conduit 30. Contact member 44 includes a leading edge 46, a tapered trailing edge 48, and a planar contact surface 49 (see FIG. 5) configured to mate with a planar surface (for example, fixed wall 90 described below and shown in FIG. 5) of second segment 52. The movable element 14 is moveably adjustable along a linear axis through a range of positions between an open (retracted) position and a closed position, with movement of the movable element 14 being limited to the linear axis. The open position allows a maximum fluid flow through the conduit 30. The fluid flow through the conduit 30 decreases as the movable element 14 is moved toward the closed position due to contact with the fluid. Adjustment of the movable element 14 in element bore 40 may be performed using, for example, a linear actuator, a stepper motor, a hydraulic or pneumatic actuator, a solenoid, a servo motor, or a manual device such as a threaded shaft with a thumb turn button. The position of the movable element 14 may be determined using, for example, a device or sensor 15 such as a Hall effect sensor, magnetostrictive devices, linear variable differential transformers (LVDTs), optical encoder, and other position determining technologies.

Limiting movement of element 14 to linear motion within element bore 40 may simplify positioning of movable element 14. Other methods may "infer" a position of the moveable element 14 based on incremental movement related to the moveable element. In one example method, the movable element 14 may be moveable a certain number of steps from a reference position such as a fully open or fully closed position. Software controlling the device 10 may be programmed to convert the number of steps traveled into the distance traveled. An independent position measuring device would not be needed in such a configuration, which may reduce the amount and complexity of hardware used for device 10. A possible drawback of this method is the potential for inaccurate position measurements if the element becomes locked in a single position and the processor thinks that the element is moving a certain number of steps when the element is actually stationary. An encoder used with a stepper motor or with a linear actuator, or other devices that "infer" a linear position from related incremental movement may have similar issues of potential inaccuracy.

Second segment 52 includes an inlet portion 60, an outlet portion 62, and an orifice portion 64 positioned between the inlet and outlet portions 60, 62. The inlet portion 60 is in fluid communication with sensor chamber 32 at one end, and includes a plurality of tapered surfaces at a second end adjacent to the orifice portion 64. Similarly, outlet portion 62 is in fluid communication with sensor chamber 34 at one end, and includes a plurality of tapered surfaces at an opposing end adjacent to orifice portion 64.

The inlet and outlet portions of the orifice segment of the device include a plurality of fixed sidewalls that define a noncircular cross-section in this embodiment. Other embodiments may include inlet and outlet portions of the orifice segment that have a circular cross-section (see example cross-section of inlet portion 160 in FIG. 9), which configuration may be preferred in some instances. The example first and third portions 60, 62 include four fixed walls substantially in the shape of a square (see example cross-section of inlet portion 60 in FIG. 7). As used throughout this document, rectangular is defined as a four-walled shape and a square is defined as a rectangle that has four walls of the same length. The walls of a rectangle are substantially flat or linear and the intersection of two walls provides an angle of about 90°. In some applications, the corners of the rectangle may be tapered slightly with a round, fillet, chamfer or like feature as a result of manufacturing limitations. Further, a portion of one or more of the walls may be slanted or chamfered slightly to create sealing points or to meet other design goals and/or address manufacturing limitations. In embodiments that include a combination of linear and curved walls (not shown), the intersection of these walls may also include features such as rounds, fillets, chamfers, etc. Finally, a portion of one or more of the walls may be formed by the exposed face of a gasket or seal.

Tapers 70, 72, 74, 76 are formed in the sidewalls of inlet portion 60 to reduce the cross-sectional area at the point where inlet portion 60 abuts to orifice portion 64. The tapers 70, 72, 74, 76 are aligned at a single axial position so as to create a reduction in cross-sectional area of portion 60 in a single step (see FIG. 3–5). Outlet portion 62 also includes a square shaped cross-section with tapered surfaces 78, 80 (see FIG. 4) on opposing sidewalls so as to reduce the cross-sectional area of outlet portion 62 at the transition point between orifice portion 64 and outlet portion 62.

Orifice portion 64 includes three fixed walls 90, 92, 94 with fixed wall 90 including a tapered trailing edge 96 and a leading edge 98 (see FIG. 5). As a result, the cross-sectional area of orifice portion 64 tapers out to the larger cross-sectional area of portion 62 in two steps with sets of tapers 96, 48 and 78, 80. As shown in the cross-sectional view of FIG. 8, orifice portion 64 has a relatively small cross-sectional area as compared to the cross-sectional area of inlet portion 60 shown in FIG. 7.

The leading edges 46, 98 and trailing edges 96, 48 of respective moving element 44 in orifice portion 64 provide consistent flow characteristics into and out of the orifice portion 64. A cross-sectional size of the orifice portion 64 is determined by the location of the movable element 14 in relation to the fixed walls 90, 92, 94 of the orifice portion 64. The orifice portion 64 is void of sensor openings and dead volume spaces to avoid disruptions to the fluid flow and potential accumulation of process material or sediment.

A linear actuator (not shown) such as those discussed above (e.g., stepper motor, servo motor, etc.) may be used to affect movement of the movable element 14. By moving along a single linear axis, the movable element 14 linearly changes the cross-sectional size of the orifice portion 64 while maintaining a generally uniform shape to provide a relatively consistent set of flow characteristics through the range of movable element positions. The cross-sectional shape of orifice portion 64 allows repeatable regulation of the fluid flow in accordance with the position in the range of positions of the movable element 14. In one example wherein the uniform shape is a rectangle, the height of the cross-sectional area of the orifice portion 64 is reduced in size as the movable element 14 moves between the open and closed positions. Maintaining a rectangular shape, or at least a shape having at least one planar or linear sidewall, minimizes variations in flow characteristics (variable "C" in the flow rate equation in the Background section), thus reducing errors when determining the flow rate for each orifice size.

In use, fluid first enters flow device 10 (which example will be used for the remainder of the description of various aspects of the invention) through first segment 50 of conduit 30. The flow through segment 50 has flow characteristics that match the circular cross-section of first segment 50. The flow then enters the open sensor chamber 32 where a transition volume is provided prior to the fluid flow entering the non-circular inlet portion 60 of second segment 52. The flow is then reduced in cross-sectional area by the several tapers formed in inlet portion 60 just before orifice portion 64. As mentioned above, a higher pressure is generated at the inlet to orifice portion 64 due to the very small cross-sectional area of orifice portion 64 and the wall-like structure created by leading edges 46, 98. The cross-sectional area of orifice portion 64 is dependent on the position of moveable element 14 in the direction A. Each position along the direction A corresponds to a different cross-sectional area of the orifice portion 64 for use in determining the volumetric flow through the flow device 10.

Figure 10:
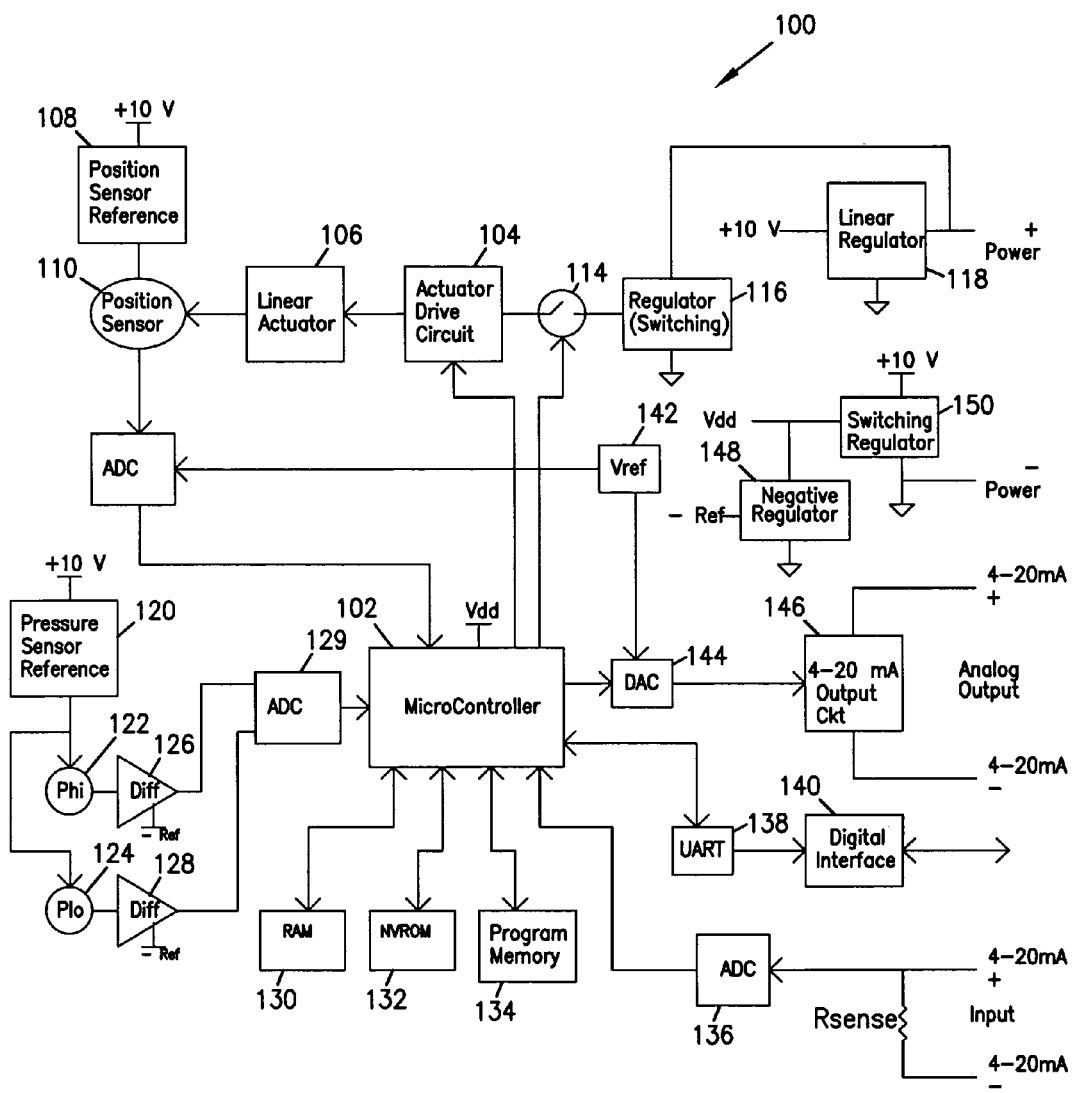
FIG. 10 is schematic process diagram of an example flow device according to principles of the present invention.

As the fluid exits orifice portion 64, the cross-sectional area of the fluid flow increases due to tapers 78 and 80 and trailing edges 48 and 96 of the moveable element 14 and orifice portion 64 as the flow enters portion 62. The cross-sectional area of outlet portion 62 preferably has the same size and shape as the cross-section of inlet portion 60 (which is a square cross-section in the example flow device in flow device 10—see FIG. 10). Flow exiting outlet portion 62 enters sensor chamber 34 where another transition volume is provided before the fluid flow enters the third segment 54 and takes on a flow pattern for the circular cross-section of third segment 54.

The first and second pressure sensors 16, 18 are positioned at opposing sides of orifice portion 64 so as to be able to determine a difference in pressure at the inlet and outlet sides of second segment 52 of conduit 30. The first and second pressure sensors 16, 18 may be mounted proximate the process liquid to minimize the amount of dead volume of the fluid and reduce crystallization and particle buildup between the first and second pressure sensors 16, 18 and the fluid in conduit 30. In other aspects of the present invention, a single differential pressure sensor may be used to communicate with both the first and second sensor chambers 32, 34 to determine the pressure difference. Furthermore, only a single pressure sensor may be required in applications where one of the first or second sensor chamber 32, 34 has a fixed pressure. For example, if the second sensor chamber 34 is downstream of the orifice and empties into an open tank at atmospheric pressure, a downstream pressure measurement is not required and the pressure measurement from the first sensor 16 may be used singly with atmospheric pressure to determine the pressure differential. Likewise, if the first sensor chamber 32 is upstream of the orifice portion 64 and is accepting liquid from a pressurized tank where pressure is tightly controlled to a fixed value, an upstream pressure is not required and the pressure measurement from the second sensor 18 may be used singly with the fixed upstream pressure value to determine the pressure differential.

Other example embodiments may use a single differential pressure sensor that takes pressure readings from the inlet and outlet sides of the orifice portion of the device and determines a differential pressure across the orifice portion. This and other types of sensors do not necessarily have to be mounted in a sensor bore, nor does the sensor bore being used require a larger cross-sectional area than the cross-sectional area of the conduit. For example, a sensor may be configured to obtain pressure readings using a small probe that requires a very small entrance opening into the conduit relative to the conduit size, and the sensor can be mounted at a different location within or adjacent to the device housing.

Yet further embodiments may not include any sensors associated directly with the device, but may be configured to use pressure signals provided by outside sources. Such pressure readings from an outside source may include, for example, a pressure reading from a pressure sensor positioned up or down stream from the device, or a pressure signal representative of a know static pressure condition for the system either up or down stream of the device. Thus, although the device does not require a pressure sensor, the device is preferable configured to use a pressure signal for purposes of metering and controlling fluid flowing through the device.

A pressure signal representing a pressure differential across an orifice may be used with the cross-sectional area of the orifice, the cross-sectional area of the inlet and outlet portions just before and after the orifice, and the density of the fluid to determine the volumetric flow rate (discussed in the Background section above).

An advantage of the present invention is that the pressure signal ($\Delta P$) may be optimized at each flow rate by varying the orifice size. For example, the pressure signal may be set at a minimum value for a given flow rate by varying the orifice size. Furthermore, the pressure signal may be optimized for every desired flow rate and inlet pressure available by varying the orifice size.

Furthermore, although the cross-sections of the inlet, outlet and orifice portions 60, 62, 64 of second segment 52 are shown having a rectangular shape, it may be appreciated that the cross-sections may be cross-sections of different shapes, such as, but not limited to, rectangles, isosceles triangles or the like. Furthermore, different portions of the second segment 52 may have dissimilar cross-sectional shapes and sizes, and may have varying shapes or sizes along a length of each portion of the second segment 52. Additionally, although the orifice portion 64 has a rectangular cross-section, the leading and trailing portions of the orifice portion 64 defined by the leading and trailing edges 44, 46 of the movable element 14 and the leading and trailing edges 98, 96 of the fixed walls 90, 92, 94 may be of different sizes, shapes and orientations than those shown in the Figures.

Other example flow devices and further aspects of the flow device 10 are shown and described in U.S. patent application Ser. No. 10/728,594 filed on Dec. 3, 2003, and entitled APPARATUS FOR CONTROLLING AND METERING FLUID FLOW, which patent application is incorporated by reference herein in its entirety Features of the preferred embodiment flow device 10 shown in FIGS. 1–9 are shown schematically as part of a flow device assembly 100 in FIG. 10. Assembly 100 includes a microcontroller 102 that controls and communicates with most of the other assembly features. Assembly 100 includes a actuator drive circuit 104, a linear actuator 106, a position sensor reference 108, a position sensor 110, and an analog-to-digital converter (ADC) 112 that relate to the flow device variable sized orifice, and a switch 114, regulator 116, regulator 150, and linear regulator 118 that control power to the features 106, 108, 110, 112. Microprocessor 102 may be any suitable processor or controller such as, for example, the HD64F3062 16-bit microprocessor manufactured by RENESAS of San Jose, Calif.

The assembly 100 also includes a pressure sensor reference 120, a high pressure sensor 122, a low pressure sensor 124, and difference amplifiers 126, 128 and an ADC 129 that together are used to determine a pressure differential in the flow device. Different memory devices such as RAM 130, NVROM 132, and program memory 134 may be used by the microprocessor 102 to store data, such as the example array of FIG. 11 (and/or the polynomial equations below), instructions, code, algorithms, etc.

The microprocessor 102 may receive inputs in the form of current signals having a magnitude of, for example, 4–20 mA that are converted to digital signals using ADC 136, and may communicate with direct digital signals through a UART 138 and a digital interface 140. Microprocessor 102 may also generate output signals that are converted to analog signals with the voltage reference 142, digital-to-analog converter (DAC) 144 and an output circuit 146 that generates signals having a magnitude of, for example, 4–20 mA. Assembly 100 may use a power source that includes a negative regulator 148 and the switching regulator 150 for powering various features of the assembly 100.

II. Software Correction Methods

A variable orifice flow meter has an inherent drawback of losing some accuracy due to slight changes in the discharge coefficient at different orifice openings, and for different flow rates at any given opening. The example flow metering and controlling devices disclosed herein provides a means of overcoming these two drawbacks using software correction for the discharge coefficient. Rather than using a single discharge coefficient for the device for all flow calculations, a discharge coefficient that is dependent upon the orifice opening and the differential pressure measured may be used in each flow calculation. An array (see example array in FIG. 11) of discharge coefficient values for the range of differential pressures and orifice openings to be used may be stored in memory of the flow meter and the appropriate value can be accessed and used by the flow meter for each individual flow calculation.

As discussed above, a Hall effect sensor may be used to measure a linear position of a magnet contained in the movable element of the flow device that varies the orifice opening of the flow device. Since the orifice opening in the flow device 10 shown in FIGS. 1–9 has at least one planar wall, the orifice cross-sectional area is linearly proportional to the position of this sliding element. By monitoring the Hall effect sensor output, the microprocessor 102 in flow meter assembly can determine the orifice opening area, which is one index of the example array shown in FIG. 11. The microprocessor 102 is configured to read the pressure sensors 122, 124 each time it performs a flow calculation. By reading the pressure sensors 122, 124 and calculating the differential pressure, the microprocessor 102 determines the pressure value for the second index of the array shown in FIG. 11. For values between the differential pressure and position points listed on the array, simple linear interpolation can be used to determine an exact discharge coefficient value between values in the array.

Figures 11, 12:
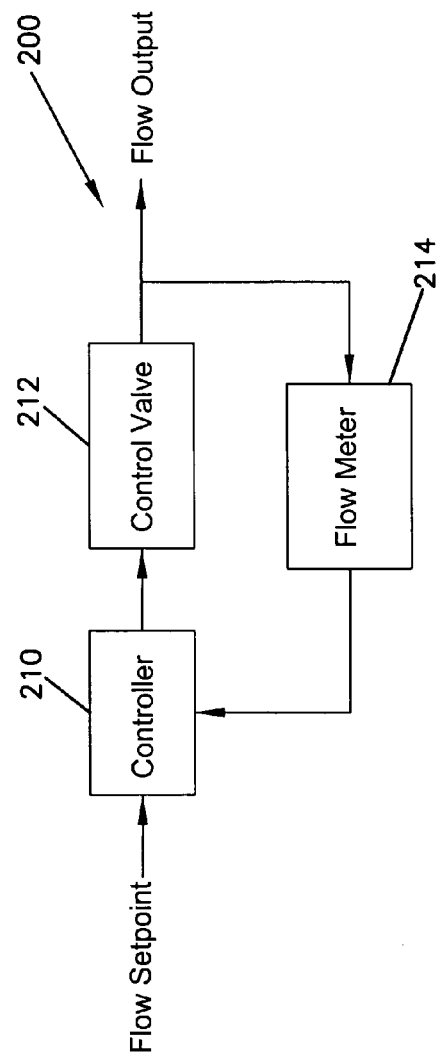
FIG. 11 is an example array of discharge coefficients based on orifice size and pressure differential for an example variable orifice flow device according to principles of the present invention.
FIG. 12 is a schematic representation of a fluid flow control device.
Figure 17:
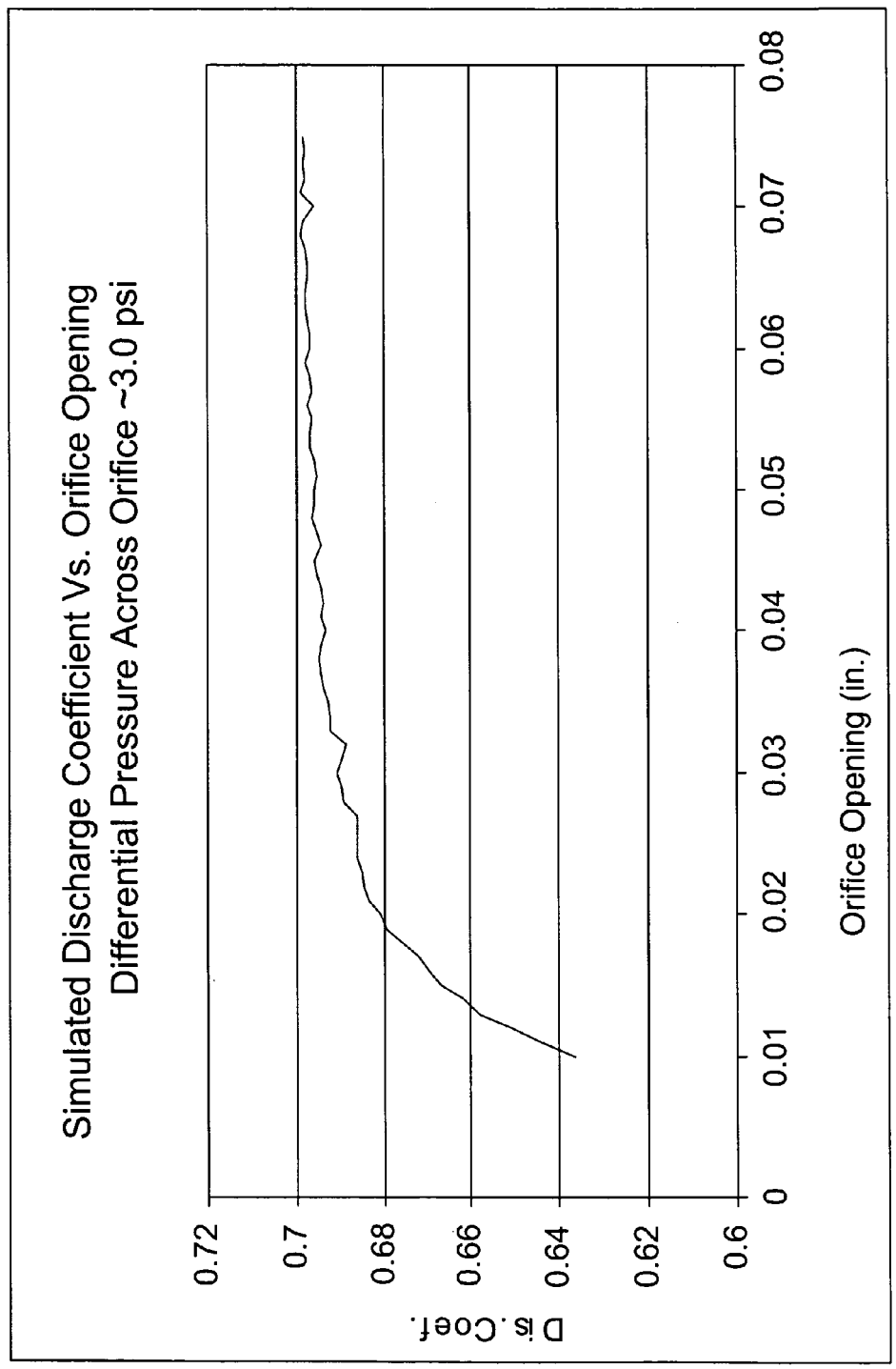
FIG. 17 is a chart representing discharge coefficient verses an orifice size for a simulated flow device.
Figure 18:
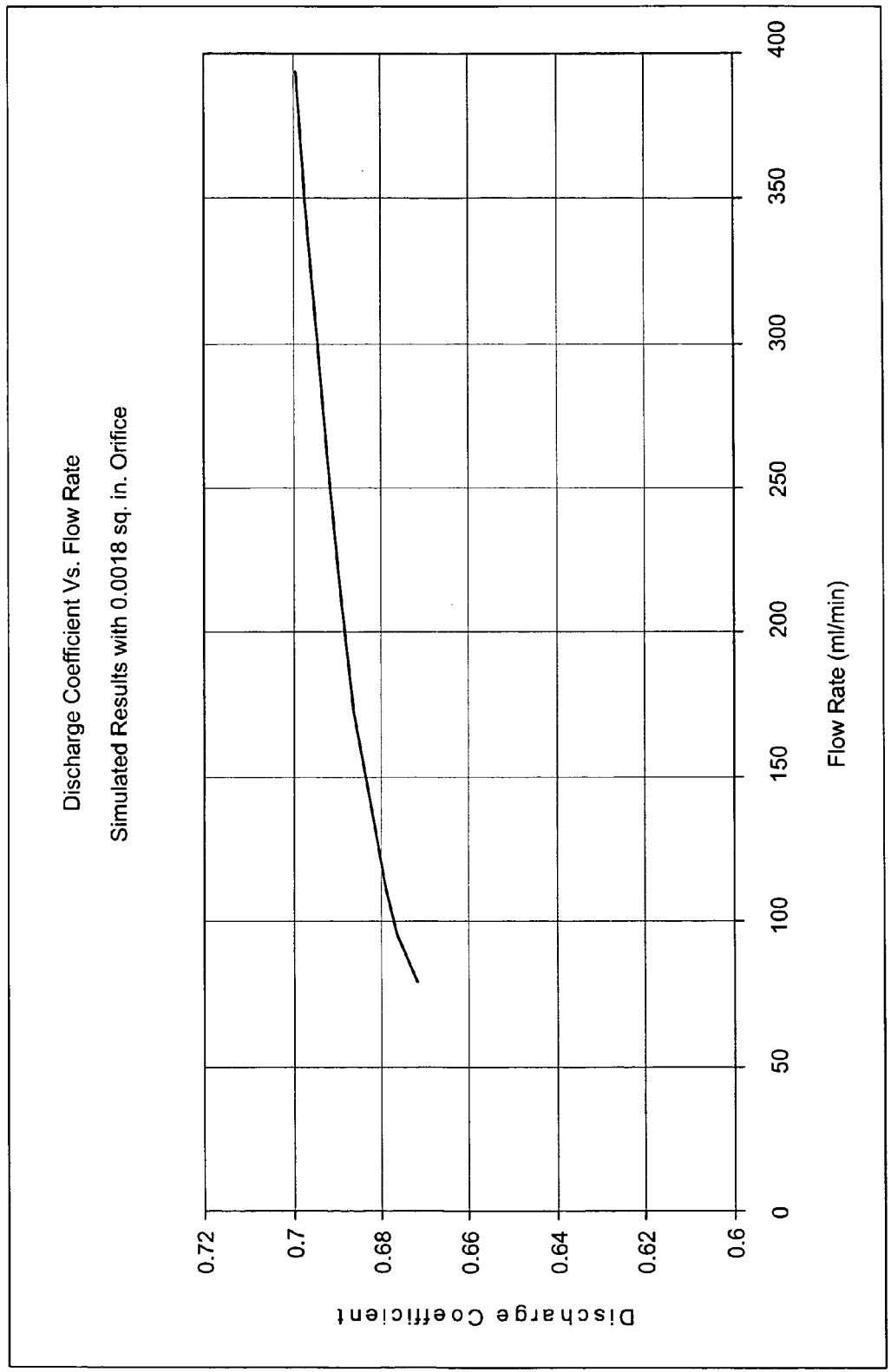
FIG. 18 is a chart representing discharge coefficient verses flow rate for a simulated flow device having a fixed orifice size.

The two dimensional array of values for discharge coefficient shown in FIG. 11 may be determined by design and stored in the program memory 134 of each flow meter. The discharge coefficient values in the array may also be determined by testing for each individual flow meter manufactured, which would provide a unique and more accurate array for each flow meter. Array values may be stored in the nonvolatile memory (NVROM) 132 or other memory associated with the flow meter assembly 100. Other embodiments may include arrays having indices that extend in range beyond the range shown in FIG. 11, and may include more or less resolution depending upon the level of accuracy desired. Also, since the change in discharge coefficient versus orifice opening and flow rate is not linear (see simulated results of FIGS. 17 and 18), the values on each axis of the array need not be linear. In this way, the array can be kept as small as possible to reduce memory requirements while maintaining the desired accuracy. Further, although the position of the orifice is linearly proportional to the cross-sectional area of the orifice in the flow device 10, other embodiments may not include a linear relationship between the area and linear position of the movable element. In such embodiments, the index of the array could be either a position of the movable element or the cross-sectional area of the orifice.

FIG. 19 further illustrates the relationship between discharge coefficient and flow rate as a plot of know values that is presented in the technical book: JOHN A. ROBERSON AND LAYTON T. CROWE, ENGINEERING FLUID MECHANICS, at 612 (1993). FIG. 19 plots the flow coefficient (K) as the y-axis and the Reynolds Number (Re) as the x-axis, wherein the flow coefficient and Reynolds Number relate to the discharge coefficient (C) and the flow rate (Q), respectively, as follows in Equations 2 and 3:

$$K = \frac{C}{\left[1 - \left(\frac{A_o}{A_p}\right)^2\right]^{1/2}} \qquad \text{Equation 2}$$

$$Re_d = \frac{4Q}{\pi d \rho} \qquad \text{Equation 3}$$

FIG. 19 also plots across the top axis a relationship between the Reynolds Number and flow coefficient as follows in Equation 4:

$$\frac{Re_d}{K} = (2g\Delta h)^{1/2}\frac{d}{v} = \left(\frac{2\Delta P}{\rho}\right)^{1/2} \qquad \text{Equation 4}$$

Where:
  $Re_d$=Reynolds Number in the orifice section
  D=diameter of the pipe
  d=diameter of the orifice (rectangle orifice related to d using hydraulic radius)
  v=kinematic viscosity of the fluid
  ρ=density of the fluid For fixed values of the orifice diameter and the kinematic viscosity, the Reynolds Number changes only with a change in flow rate. The coefficient relationships provided in equations 2–4 result in FIG. 19 essentially representing the change in discharge coefficient versus flow rate.

The individual curves shown in FIG. 19 illustrate the significant changes in discharge coefficient that result as flow rate (represented as Reynolds Number) increases from low flow rates to high flow rates for a given orifice-to-pipe size ratio. The difference from one curve to the next in FIG. 19 represents the change in discharge coefficient that occurs when the size of the orifice is changed with respect to the pipe size.

Figure 13:
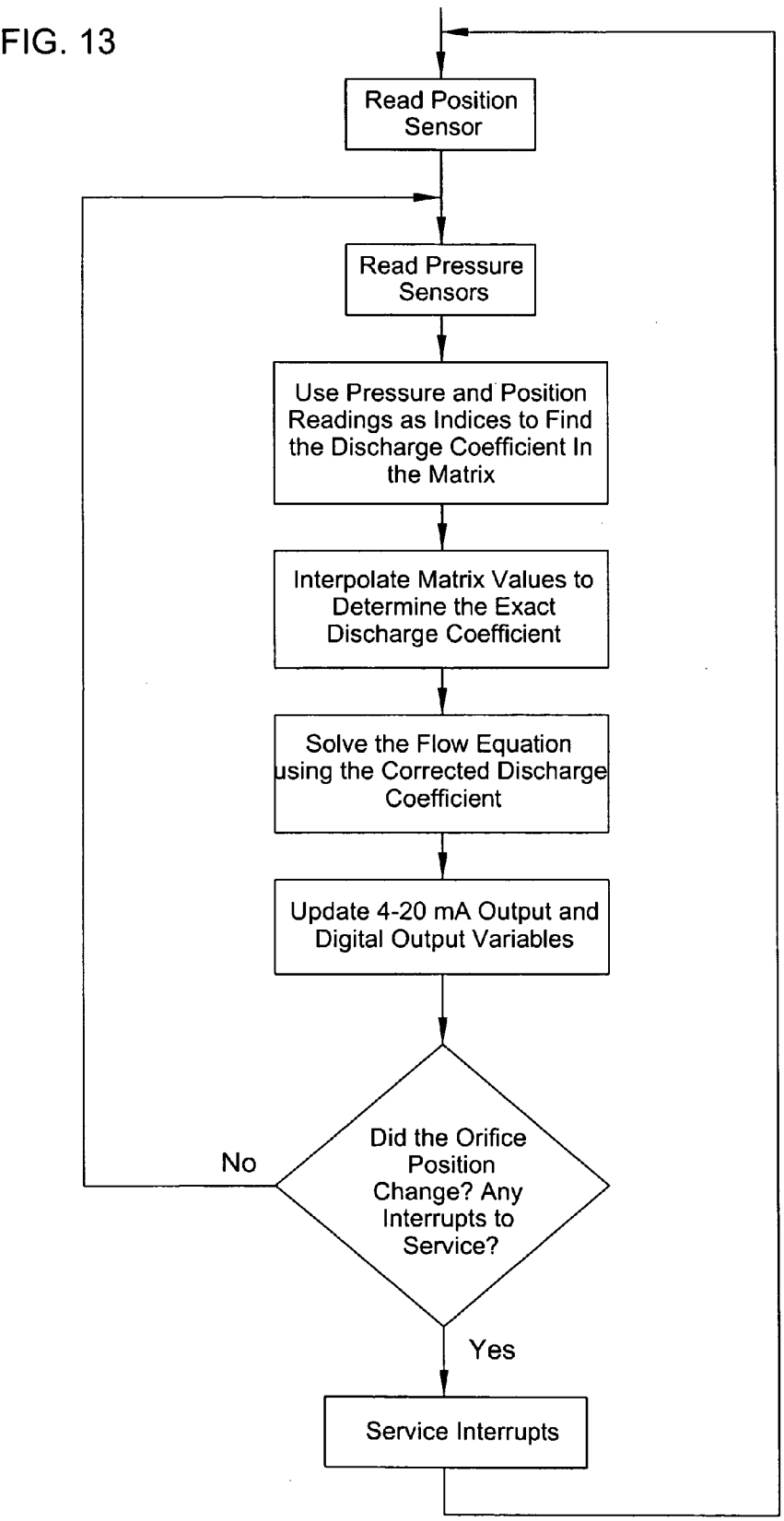
FIG. 13 is a flow diagram representing an example method of determining fluid flow through a flow device according to principles of the present invention.

The flow chart in FIG. 13 illustrates the steps involved in determining an optimum discharge coefficient for a given flow device. These steps may be implemented in programming stored in local memory (e.g., program memory 134) or may be downloaded or transmitted to the microcontroller 102. The process may begin by reading a position sensor to determine a position of the flow meter movable element thereby determining an area of the variable orifice. Reading the pressure sensors may be performed before, after, or concurrently with reading the position sensor. The pressure and position readings are used as indices to look up a discharge coefficient in a stored array of discharge coefficients. The discharge coefficient is interpolated if necessary to determine an exact discharge coefficient value. The discharge coefficient is then input into a flow equation and a fluid flow is calculated from the flow equation. The analog and digital output variables can then be updated using the fluid flow and sensor readings. If there are no changes in the orifice position or any interrupts to service of the flow device, the cycle repeats with a new pressure reading. If there are interrupts to service or a change in the position sensor, the cycle repeats from the beginning.

The two dimensional array of discharge coefficient values shown in FIG. 11 may also be determined by the microprocessor 102 using a polynomial that inputs the orifice opening size and the differential pressure as variables. An example polynomial is listed below as Equation 5.

$$C = A \cdot (P_{hi} - P_{lo})^2 + B \cdot (P_{hi} - P_{lo}) + D \cdot (A_o)^2 + E \cdot (A_o) + F \qquad \text{Equation 5}$$

Where:
A, B, D, E and F=constants
C=orifice discharge coefficient
$A_o$=cross-sectional area of the orifice
$P_{hi}$=upstream pressure
$P_{lo}$=downstream pressure The constants A, B, D, E and F are typically determined during manufacture when characterizing differential pressure and the discharge coefficient versus orifice opening. The constants and discharge coefficient rather than array values may be stored in the memory of the flow meter assembly 100. The polynomial coefficients could be determined by design and be the same for each flow meter manufactured and stored in program memory 134, or the coefficients could be determined by calibration and be unique for each flow meter manufactured and then stored in nonvolatile memory 132.

Figure 14:
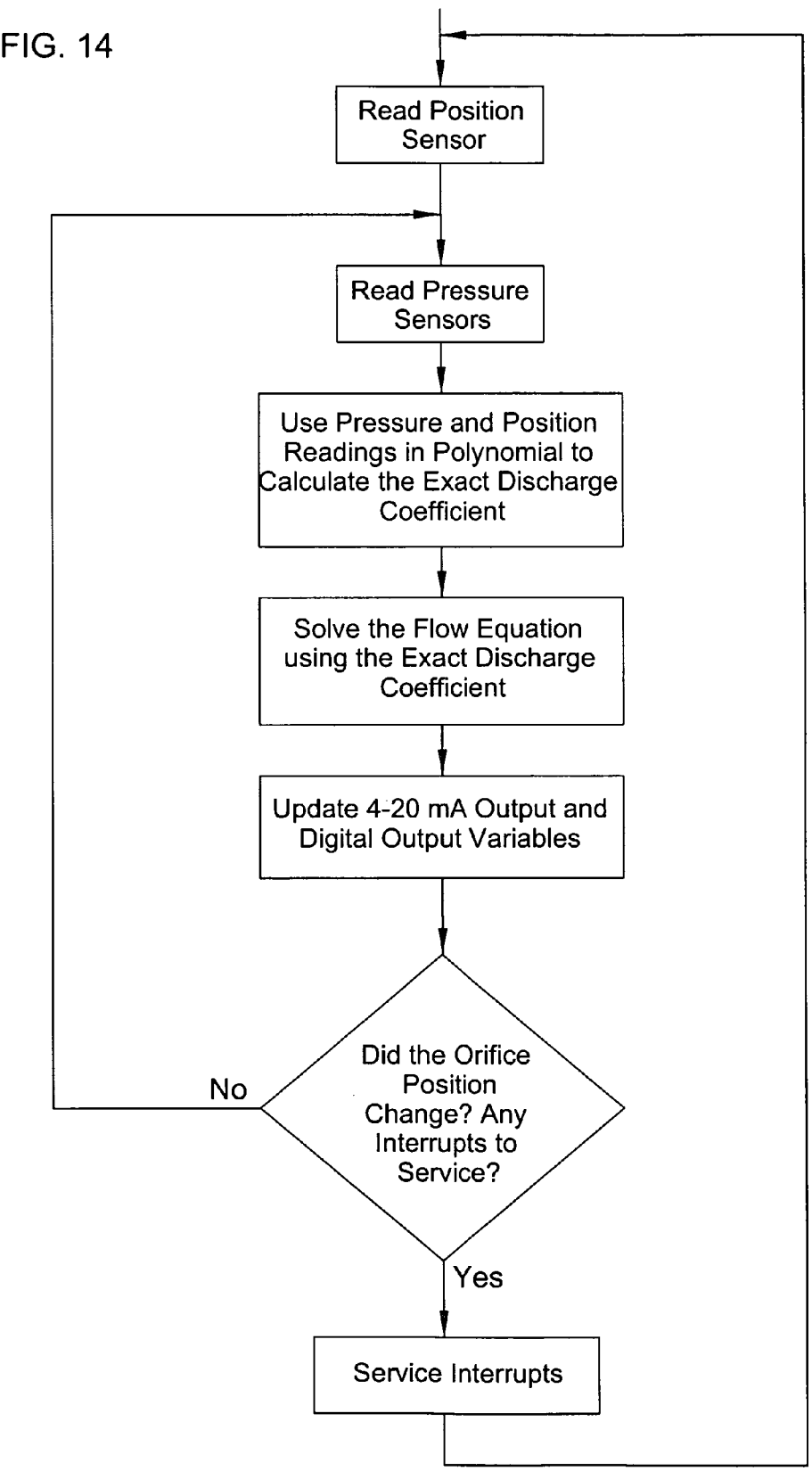
FIG. 14 is a flow diagram representing another example method of determining fluid flow through a flow device according to principles of the present invention.
Figure 15:
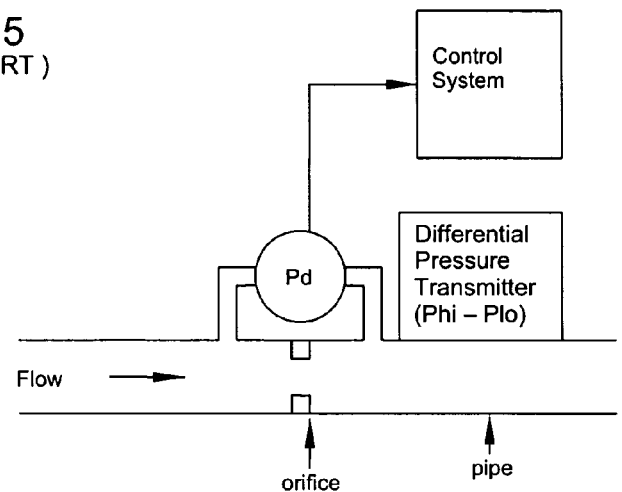
FIG. 15 is a schematic representation of a pressure differential measuring device configured to measure a pressure differential across an orifice.
Figure 16:
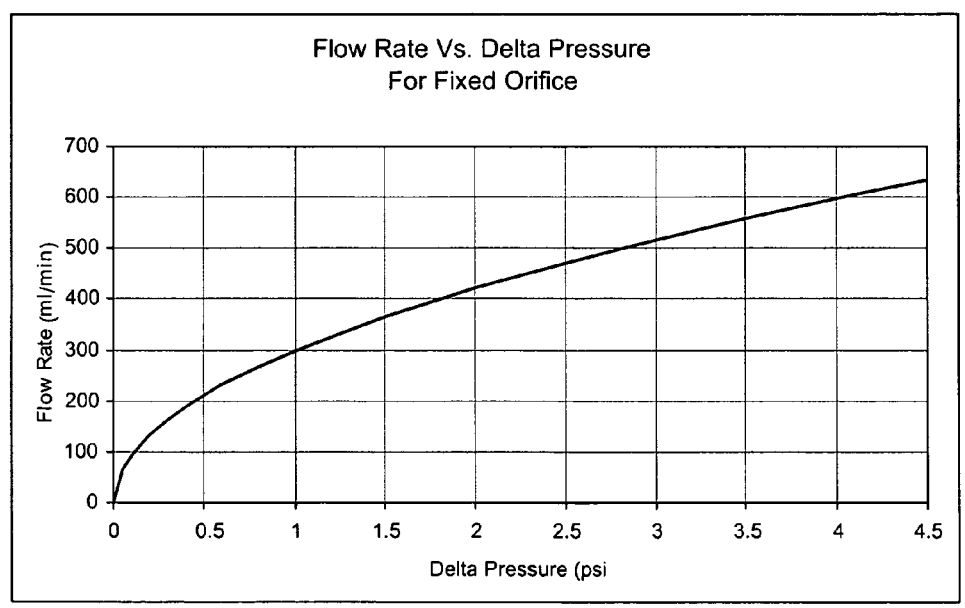
FIG. 16 is a chart representing flow rate verses pressure differential for an example flow device having a fixed orifice size.

The flow chart in FIG. 14 illustrates the steps for determining an optimum discharge coefficient and performing a flow calculation using a polynomial. The process may begin by reading a position sensor to determine a position of the flow meter movable element thereby determining an area of the variable orifice. Reading the pressure sensors may be performed before, after, or concurrently with reading the position sensor. The pressure and position readings are input into a polynomial and an exact discharge coefficient is calculated. The calculated discharge coefficient is input into a flow equation and a fluid flow is calculated from the flow equation. The analog and digital output variables can then be updated using the fluid flow and sensor readings. If there are no changes in the orifice position or any interrupts to service of the flow device, the cycle repeats by taking new pressure sensor readings. If there are interrupts to service or a change in the position sensor reading, the cycle repeats from the beginning.

Principles of the present invention also encompass a device that can function either as a variable orifice flow meter or as a flow controller. The electrical hardware for a variable orifice flow meter and a flow controller may be similar. One difference between a flow metering and a flow control device involves additional software functionality required for the flow controller. FIG. 12 is a block diagram showing the basic features of a flow device 200. Device 200 includes a controller 210, a control valve 212, and a flow meter 214. The controller 210 may include software that compares the desired flow set point to a measured flow rate measured by the flow meter 214. The controller 210 then sends a signal to the control valve 212 to vary an orifice opening to increase or decrease flow rate as required to meet the flow set point. Flow metering is performed in the same or a similar way for the flow controller as performed for the variable orifice flow meter 10 described above. Therefore, the two-dimensional correction for the discharge coefficient of the orifice via the array (e.g., see FIG. 11) or a polynomial (e.g., Equation 5) can be used both in the variable orifice flow meter 10 and in the flow meter function in the flow controller 200.

III. Conclusion

This example flow devices and software correction systems described herein are exemplary of apparatuses and methods for improving the accuracy of a variable orifice flow meter. The method includes simultaneously characterizing the discharge coefficient of the orifice for different orifice openings and for different differential pressures (flow rates). By characterizing the discharge coefficient of the orifice for these two parameters and correcting for them in the flow calculation, the flow meter is able to maintain flow measurement accuracy over a broad range of flow rates. In this way, the flow meter may be useful for flow ranges of up to 10 times the flow range of conventional differential pressure flow meters and perform accurately over that entire flow range.

The above specification, examples and data provide a complete description of the manufacture and use of the composition of the invention. Since many embodiments of the invention may be made without departing from the spirit and scope of the invention, the invention resides in the claims hereinafter appended.

We claim:

1. A method of metering fluid flow through a variable orifice, the method comprising the steps of:
   determining a cross-sectional area defined by the variable orifice;
   measuring a pressure differential across the variable orifice;
   determining a discharge coefficient using the determined cross-sectional area and the measured pressure differential; and
   determining a fluid flow through the variable orifice using the determined discharge coefficient;
   wherein determining the discharge coefficient includes selecting a discharge coefficient from an array of discharge coefficient values generated in a calibration process.

2. A method of metering fluid flow through a variable orifice, the method comprising the steps of:
  determining a cross-sectional area defined by the variable orifice;
  measuring a pressure differential across the variable orifice;
  selecting a discharge coefficient from an array of discharge coefficient values, the discharge coefficient being dependent on the determined cross-sectional area and the measured pressure differential; and
  solving a flow equation using the selected discharge coefficient to determine the fluid flow.

3. The method of claim 2, further comprising interpolating between two discharge coefficient values in the array values to determine an exact discharge coefficient.

4. The method of claim 2, wherein the variable orifice includes a movable element, and determining the cross-sectional area of the orifice includes determining a position of the movable element.

5. The method of claim 4, wherein the movable element includes at least one linear surface and the variable orifice also includes a conduit having at least one linear surface, wherein the linear surface of the movable element and the linear surface of the conduit are configured to mate with each other.

6. The method of claim 2, further comprising first and second pressure sensors configured to provide respective first and second pressure signals, and measuring the pressure differential includes subtracting the first and second pressure signals.

7. The method of claim 2, further comprising repeating the method steps at predetermined timed intervals.

8. A method of metering fluid flow through a variable orifice, the method comprising the steps of:
  determining a cross-sectional area of the variable orifice;
  measuring a pressure differential across the variable orifice;
  calculating a discharge coefficient using the determined cross-sectional area and the measured pressure differential; and
  solving a flow equation using the calculated discharge coefficient to determine the fluid flow;
  wherein the variable orifice includes a movable element, the movable element including at least one linear surface and the variable orifice also includes a conduit having at least one linear surface, wherein the linear surface of the movable element and the linear surface of the conduit are configured to mate with each other, and determining the cross-sectional area of the orifice includes determining a position of the movable element.

9. A device for metering fluid flow, of the type having a variable orifice, comprising:
  a variable sized orifice defined by a fluid flow conduit and an element moveable relative to the fluid flow conduit to vary a size of the orifice;
  a pressure sensor configured to determine a pressure differential across the orifice and generate a pressure signal;
  a positioning device configured to determine a position of the element relative to the conduit and generate a position signal;
  a processor configured to determine the fluid flow rate using the pressure signal, the position signal, and a discharge coefficient that is dependent on the pressure signal and the position signal; and
  memory and an array of discharge coefficients stored on the memory, the processor configured to select the discharge coefficient value from the stored array when calculating the fluid flow rate.

10. The device of claim 9, further comprising a software program that controls functions of the processor.

11. The device of claim 9, wherein the array of discharge coefficients is related to a plurality of pressure signal values and position signal values determined during a calibration of the device.

12. A method of metering fluid flow through a variable orifice, the method comprising the steps of:
  determining a cross-sectional area defined by the variable orifice;
  measuring a pressure differential across the variable orifice;
  determining a discharge coefficient using the determined cross-sectional area and the measured pressure differential; and
  determining a fluid flow through the variable orifice using the determined discharge coefficient;
  wherein determining the discharge coefficient includes calculating a discharge coefficient using a polynomial, the polynomial including at least one polynomial coefficient determined in a calibration process.

13. A method of metering fluid flow through a variable orifice, the method comprising the steps of:
  determining a cross-sectional area of the variable orifice;
  measuring a pressure differential across the variable orifice;
  calculating a discharge coefficient using the determined cross-sectional area and the measured pressure differential; and
  solving a flow equation using the calculated discharge coefficient to determine the fluid flow;
  wherein calculating the discharge coefficient includes inputting the determined cross-sectional area and the measured pressure differential into a polynomial.

14. A device for metering fluid flow, of the type having a variable orifice, comprising:
  a variable sized orifice defined by a fluid flow conduit and an element movable relative to the fluid flow conduit to vary a size of the orifice;
  a pressure sensor configured to determine a pressure differential across the orifice and generate a pressure signal;
  a positioning device configured to determine a position of the element relative to the conduit and generate a position signal; and
  a processor configured to determine the fluid flow rate using the pressure signal, the position signal, and a discharge coefficient that is dependent on the pressure signal and the position signal;
  wherein the processor calculates the discharge coefficient using a polynomial and the pressure and position signals.

* * * * *